United States Patent
Maekawa et al.

(10) Patent No.: US 6,284,423 B1
(45) Date of Patent: Sep. 4, 2001

(54) ELECTROSTATIC IMAGE DEVELOPING TONER

(75) Inventors: Hiroshi Maekawa, Chiba; Kazuo Hisamatsu; Yuji Emura, both of Kanagawa; Koichi Ogawa; Katsuhiko Mizushima, both of Saitama, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/460,416

(22) Filed: Dec. 14, 1999

(30) Foreign Application Priority Data

Dec. 18, 1998 (JP) .................................. 10-360991

(51) Int. Cl.⁷ .................................................. G03G 9/087
(52) U.S. Cl. ......................................................... 430/109.31
(58) Field of Search ................................... 430/109, 106, 430/111, 110, 109.31

(56) References Cited

U.S. PATENT DOCUMENTS

| | | | |
|---|---|---|---|
| 5,037,715 | * | 8/1991 | Hagiwara et al. .................... 430/109 |
| 5,792,583 | * | 8/1998 | Sano et al. ............................ 430/109 |

FOREIGN PATENT DOCUMENTS

| | | |
|---|---|---|
| 0257144A1 | 3/1988 | (EP) . |
| 0400235A1 | 12/1990 | (EP) . |
| 0438269A1 | 7/1991 | (EP) . |

* cited by examiner

Primary Examiner—John Goodrow
(74) Attorney, Agent, or Firm—Burns, Doane, Swecker & Mathis, L.L.P.

(57) ABSTRACT

Urethane modified polyester resin which has a total acid value not greater than 10 KOH mg/g and has been obtained by kneading, in a molten state, a base polyester resin (A) having an acid value of 5 to 20 KOH mg/g and a hydroxyl value of 40 to 70 KOH mg/g, a low-molecular-weight polyester resin (B) having an acid value not greater than 5 KOH mg/g, a hydroxyl value not greater than 10 KOH mg/g and a weight-average molecular weight of 3,000 to 5,000 and a polyisocyanate compound, by using the components (A) and (B) at a weight ratio of 3 to 5:7 to 5 and the polyisocyanate compound in an amount of 0.2 to 1.2 equivalent, in terms of an isocyanate group per equivalent, of the total hydroxyl groups of all the resins. This novel urethane-modified polyester resin (C) is used as a binder resin for the toner. For the preparation of the toner, the resin is mixed and kneaded with a colorant, magnetic powders, charge control agent and the like under a molten state, followed by cooling and pulverization.

9 Claims, No Drawings

ELECTROSTATIC IMAGE DEVELOPING TONER

BACKGROUND OF THE INVENTION

1. Field of the Invention

The present invention relates to an electrostatic image developing toner suitable for use in electrophotography printing, electrostatic printing or the like; and a novel urethane-modified polyester resin used for the toner. More specifically, this invention relates to an electrostatic image developing toner having good charge properties, blocking resistance and offset resistance as well as excellent resistance against sticking to a heated roll and wax dispersibility; and a novel urethane-modified polyester resin used for it.

2. Description of the Related Art

With the progress of office automation, a demand for copying machines or laser printers making use of electrophotography has shown a rapid increase and at the same time, a requirement for their performances has come to be severer. In order to obtain a visible image by electrophotography, a generally adopted process is to electrify a photo conductor such as selenium, amorphous silicon or organic semiconductor, expose it to light, develop an image by using a toner-containing developer, transfer the toner image, which has been formed on the photo conductor, to a printed body such as paper and then fix the image by using a heated roll or the like. It is needless to say that the developed image must be vivid, being free from fogging and having a sufficient image density. In recent days, however, it has strongly been requested to carry out fixation at a lower temperature, from the viewpoint of speeding up, energy saving and improvement of safety and at the same time, to provide a toner having excellent low-temperature fixing properties. For improving the fixing properties of a toner, it is generally necessary to lower the melt viscosity of the toner, thereby increasing the adhesion area with a base material to be fixed. For this purpose, the glass transition point (Tg) or molecular weight of the conventionally used binder resin is lowered. Such a countermeasure is however accompanied with the drawbacks that stable maintenance of the particle condition of the toner upon usage or storage is not easy, because a resin having a low glass transition point is usually inferior in blocking resistance; and upon fixation of the toner image by the heated-roll fixing method, the heated roll is directly brought into contact with the toner under a molten state and so-called offset phenomenon occurs, in other words, a portion of the toner transferred onto the heated roll smears a printed body such as paper or the like to be fed next. Such a tendency becomes apparent when the molecular weight of the resin is smaller.

Recently, a digital system which can output information from a computer or facsimile has drawn attentions as an electrophotographic image forming system. Since laser is used as exposure means in this digital system, a toner having a small particle size is required so as to permit the output of a more minute line and therefore a more delicate image compared with an analog system. When the particle size of a toner is reduced, however, the wax having poor dispersibility tends to fall off and be recovered as a dust. In general, the dust which has appeared in the pulverizing step is recovered and recycled as the raw material. A large wax content in the dust makes recycling difficult and is therefore not preferred. Moreover, the wax falls off from the surface of the toner during stirring with a carrier in a copying machine, by which the charge amount becomes unstable or filming occurs on a photo conductor. It is preferred to use the wax after being dispersed in the toner minutely and uniformly. As the wax, low-molecular-weight polypropylene or polyethylene is generally employed, but owing to poor compatibility with polyester or the like, the wax tends to have a large particle size in the dispersed form.

Various toners using, as a binder resin, a polyester resin instead of a styrene acrylic resin or epoxy resin are proposed in consideration of charge properties or fixing properties (ex. Japanese Patent Laid-Open No. 284771/1986, Japanese Patent Laid-Open No. 291668/1987, Japanese Patent Publication No. 101318/1995, Japanese Patent Publication No. 3663/1996, U.S. Pat. No. 4,833,057 and the like). The use of a polyester resin is however accompanied with the problem that its surface tension is greater than that of a styrene acrylic resin frequently employed as a binder resin so that winding of paper and the like onto a heated roll tends to occur. The use of a polyester resin as a binder resin, on the other hand, is also accompanied with the problem that although the negative charge properties of the resulting toner becomes higher in proportion to the concentration of the terminal carboxyl group, an increase in the concentration of the terminal carboxyl group causes lowering of moisture resistance and an electrified amount of the toner decreases, influenced by the water content at the time of high humidity, leading to a deterioration in the quality of the developed image.

Furthermore, since treatment of a copying machine including that of a toner is requested to be maintenance free, there is an eager demand for a toner which can provide a developed image stably for a long period of time.

SUMMARY OF THE INVENTION

The present invention has been made with a view to providing an electrostatic image developing toner which is free from the above-described conventional problems and at the same time, satisfy the above-described various properties which the toner has so far been required to have; and a novel urethane-modified polyester resin (C) used for the toner.

An object of the present invention is therefore to provide an electrostatic image developing toner which is excellent in each of static properties, image density, low-temperature fixing properties, offset resistance and blocking resistance and in addition is good in resistance against sticking to a heated roll and wax dispersibility. In particular, another object of the present invention is to provide an electrostatic image developing toner which permits stable formation of a high-density developed image even at high-temperature and high-humidity or low-temperature and low-humidity conditions.

A further object of the present invention is to provide an electrostatic image developing toner which permits stable formation of a developed image for a long period of time.

A still further object of the present invention is to provide a novel urethane-modified polyester resin used for an electrostatic image developing toner.

With a view to attaining the above-described objects, the present inventors have carried out an extensive investigation. As a result, it has been found that the above-described objects can be attained by incorporating, in an electrostatic image developing toner, an urethane-modified polyester resin (C) which is prepared by reacting a specific polyester resin, employed as a starting material, with a polyisocyanate and has a predetermined acid value, leading to the completion of the present invention.

The present invention relates to the below-described six aspects (1) to (6).

(1) An electrostatic image developing toner comprising an urethane-modified polyester resin (C) which has a total acid value not greater than 10 KOH mg/g and has been obtained by reacting, with a polyisocyanate compound, a molten mixture of a base polyester resin (A) having an acid value of 5 to 20 KOH mg/g and a hydroxyl value of 40 to 70 KOH mg/g and a low-molecular-weight polyester resin (B) having an acid value not greater than 5 KOH mg/g, a hydroxyl value not greater than 10 KOH mg/g and a weight-average molecular weight of 3,000 to 5,000 by using (A) and (B) at a weight ratio of 3 to 5:7 to 5 and the polyisocyanate compound in an amount of 0.2 to 1.2 equivalents, in terms of an isocyanate group, per equivalent of the total hydroxyl groups of the base polyester resin (A) and the low-molecular-weight polyester resin (B).

(2) An electrostatic image developing toner as described in (1), wherein the base polyester resin (A) has a glass transition point of 10 to 60° C. and has been obtained by polycondensation of at least three monomers, that is, at least one diol, at least one dicarboxylic acid and 0.5 to 20 mole %, based on the total amount of all the starting material monomers, of at least one polyol component having three or more hydroxyl groups; the low-molecular weight polyester resin (B) is a linear polyester resin having a glass transition point of 40 to 70° C. and having been obtained by polycondensation of at least two monomers, that is, at least one diol and at least one dicarboxylic acid; and the polyisocyanate compound is a diisocyanate compound.

(3) An electrostatic image developing toner as described above in (2), wherein the base polyester resin (A) has been obtained by polycondensation of at least one diol, at least one dicarboxylic acid, 2 to 20 mole %, based on the total amount of all the starting material monomers, of at least one long-chain aliphatic monocarboxylic acid or long-chain aliphatic monoalcohol and 2 to 20 mole %, based on the total amount of all the starting material monomers, of a polyol component having three or more hydroxyl groups.

(4) An electrostatic image developing toner as described above in (2) or (3), wherein the low-molecular weight polyester resin (B) has been obtained by polycondensation of at least one diol, at least one dicarboxylic acid and at least one monocarboxylic acid.

(5) An electrostatic image developing toner as described above in any one of (1) to (4), wherein the polyisocyanate compound is employed in an amount of 0.3 to 1.0 equivalent, in terms of an isocyanate group, per equivalent of the total hydroxyl groups of the base polyester resin (A) and the low-molecular-weight polyester resin (B).

(6) A novel urethane-modified polyester resin which has a total acid value not greater than 10 KOH mg/g and has been obtained by reacting, with a polyisocyanate compound, a molten mixture of a base polyester resin (A) having an acid value of 5 to 20 KOH mg/g and a hydroxyl value of 40 to 70 KOH mg/g and a low-molecular-weight polyester resin (B) having an acid value not greater than 5 KOH mg/g, a hydroxyl value not greater than 10 KOH mg/g and a weight-average molecular weight of 3,000 to 5,000 by using the components (A) and (B) at a weight ratio of 3 to 5:7 to 5 and the polyisocyanate compound in an amount of 0.2 to 1.2 equivalents, in terms of an isocyanate group, per equivalent of the total hydroxyl groups of the base polyester resin (A) and the low-molecular-weight polyester resin (B).

In the present invention described above, an electrostatic image developing toner comprising a low-acid-value urethane-modified polyester resin (C), which has been obtained by reacting a base polyester resin (A) having a predetermined acid value and hydroxyl value and a low-molecular weight polyester resin (B) having a predetermined acid value, hydroxyl value and molecular weight with a polyisocyanate compound, has excellent charge properties even if the polyester resin employed has a low acid value. In addition, the developed image formed using it is good and has high density even at high temperature and high humidity conditions owing to excellent moisture resistance brought by the low acid value of the polyester resin. Moreover, it has good low-temperature fixing properties, offset resistance and blocking resistance as well as excellent resistance against sticking to a heated roll and wax dispersibility. Thus, the electrostatic image developing toner according to the present invention exhibits excellent effects for permitting stable development of an image for a long period of time under any copying circumstance.

DETAILED DESCRIPTION OF THE INVENTION

As described above, the urethane-modified polyester resin according to the present invention is obtained using, as starting materials, a base polyester resin (A) and low-molecular-weight polyester resin (B) each having a predetermined acid value and hydroxyl value.

As the base polyester resin (A), any polyester resin can be used insofar as it has an acid value of 5 to 20 KOH mg/g and a hydroxyl value of 40 to 70 KOH mg/g.

The base polyester resin (A) has a hydroxy value greater than the low molecular weight polyester resin (B), and in case these compositions react with a polycondensate compound, mainly a urethane denaturation reaction occurs, and becomes a polyester resin component with a heightened molecular weight.

The base polyester resin (A) is preferably prepared by polycondensation of at least three monomers, that is, at least one diol, at least one dicarboxylic acid and 0.5 to 20 mole %, based on the total amount of all the starting material monomers, of at least one polyol having three or more hydroxyl groups, with the polycondensation in the presence of 2 to 20 mole %, based on the total amount of all the starting material monomers, of at least one long-chain aliphatic monocarboxylic acid or long-chain aliphatic monoalcohol being more preferred.

As the diol to be used for the preparation of the base polyester resin (A), any diol employed conventionally for the preparation of polyester resins can be employed. Preferred examples include ethylene glycol, 1,2-propylene glycol, 1,3-propylene glycol, 1,3-butylene glycol, 1,4-butylene glycol, 2,3-butanediol, diethylene glycol, triethylene glycol, dipropylene glycol, 1,5-pentanediol, 1,6-hexanediol, neopentyl glycol, 2-ethyl-1,3-hexanediol, hydrogenated bisphenol A, an ethylene oxide adduct of bisphenol A and a propylene oxide adduct of bisphenol A. As the ethylene oxide adduct of bisphenol A or propylene oxide adduct of bisphenol A, those represented by the following formula are preferred.

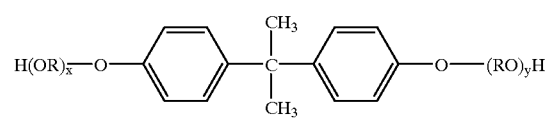

wherein R represents an ethylene or propylene group, x and y each independently stands for an integer of 1 or greater, and x+y stands for 2 to 10 on average.

As the dicarboxylic acid, any dicarboxylic acid conventionally used for the preparation of a polyester resin can be employed. Preferred examples include alkyldicarboxylic acids such as malonic acid, succinic acid, glutaric acid, adipic acid, azelaic acid and sebacic acid, unsaturated dicarboxylic acids such as maleic acid, fumaric acid, citraconic acid and itaconic acid, and aromatic dicarboxylic acids such as phthalic acid, terephthalic acid, isophthalic acid and phthalic anhydride, and anhydrides and lower alkyl esters thereof.

Examples of the polyol component having three or more hydroxyl groups include glycerin, 2-methylpropane triol, trimethylolpropane, trimethylolethane, sorbitol and sorbitan. In general, when the polyol component having three or more hydroxyl groups is added in an amount less than 0.5 mole % based on the total amount of all the starting material monomers, molecular weight heightening cannot be attained easily, leading to a tendency to insufficient offset resistance. When it exceeds 20 mole %, on the other hand, gelation tends to occur, which makes it difficult to conduct polycondensation. Amounts within a range of 0.5 to 20 mole % are therefore preferred, with a range of 2 to 20 mole % being more preferred.

Examples of the long-chain aliphatic monocarboxylic acid include aliphatic monocarboxylic acids having 8 to 22 carbon atoms, such as octanoic acid, decanoic acid, dodecanoic acid, myristic acid, palmitic acid and stearic acid. They may be branched or have an unsaturated group.

Exemplary long-chain aliphatic monoalcohols include aliphatic monoalcohols having 8 to 22 carbon atoms, such as octanol, decanol, dodecanol, myristyl alcohol, palmityl alcohol and stearyl alcohol.

The long-chain aliphatic monocarboxylic acid or long-chain aliphatic monoalcohol is preferably added in an amount of 2 to 20 mole %, based on the total amount of all the starting material monomers. When the amount is less than 2 mole %, effects for improving resistance against sticking to a heated roll and wax dispersibility are insufficient. When the amount exceeds 20 mole %, on the other hand, the monofunctional compound disturbs polymerization, leading to difficulty in molecular weight heightening. Amounts outside the above-range are therefore not preferred. The long-chain aliphatic compounds serve to lower the glass transition point of the resulting resin so that it is possible to use an aromatic monocarboxylic acid such as benzoic acid or naphthalenecarboxylic acid for the adjustment of the glass transition point.

If necessary, polycarboxylic acids having three or more carboxylic acids can be used and they are not excluded from the starting materials of the base polyester resin (A).

As the low-molecular-weight polyester resin (B), any resin can be used irrespective of its preparation process or starting materials employed for its synthesis insofar as it has an acid value not greater than 5 KOH mg/g, a hydroxyl value not greater than 10 KOH mg/g and a weight-average molecular weight ranging from 3,000 to 5,000. When the low-molecular-weight polyester resin (B) has a weight-average molecular weight less than 3,000, the resulting toner has undesired offset resistance. From the viewpoint of fixing property, the weight-average molecular weight is preferred to be not greater than 5,000. Preferred examples of the low-molecular-weight polyester resin (B) include linear polyester resins prepared using at least one diol and at least one dicarboxylic acid and optionally at least one monocarboxylic acid.

Preferred examples of the diol and dicarboxylic acid used for the preparation of the low-molecular-weight polyester resin (B) are similar to those exemplified as the starting materials for the preparation of the above-described base polyester resin (A).

Illustrative of the monocarboxylic acid include aliphatic monocarboxylic acids having 8 to 22 carbon atoms, such as octanoic acid, decanoic acid, dodecanoic acid, myristic acid, palmitic acid and stearic acid; and aromatic monocarboxylic acids such as benzoic acid. Among them, benzoic acid is particularly preferred.

The polycondensation for obtaining each of the base polyester resin (A) and low-molecular-weight polyester resin (B) can be carried out in a known manner such as polycondensation at high temperature in a solventless manner or solution polycondensation, each in an inert gas such as nitrogen gas. Upon polycondensation, the using ratio of an alcohol (monoalcohol, diol, triol or the like) to a carboxylic acid (dicarboxylic acid, monocarboxylic acid or the like) ordinarily ranges from 0.7 to 1.4 as a ratio of the hydroxyl group of the former to the carboxyl group of the latter.

The urethane-modified polyester resin (C) of the present invention having a total acid value not greater than 10 KOH mg/g is prepared by reacting the base polyester resin (A) and the low-molecular-weight polyester resin (B) with a polyisocyanate compound. When the low-molecular-weight polyester resin (B) is used in an excessively large amount, the resulting urethane-modified polyester resin (C), serving as a binder resin for the electrostatic image developing toner deteriorates the offset resistance of toner. Excessively large amounts of the base polyester resin (A), on the other hand, tend to deteriorate the low-temperature fixing properties of the toner. The mixing ratio of the base polyester resin (A): the low-molecular-weight polyester resin (B) is preferably 3 to 5:7 to 5. The total acid value of the urethane-modified polyester resin (C) exceeding 10 KOH mg/g is not preferred, because it lowers the charged amount of the toner containing the resulting urethane-modified polyester resin (C), which makes it impossible to form a developed image having a sufficient density even if the temperature and humidity conditions are not high.

Examples of the polyisocyanate compound include diisocyanates such as hexamethylene diisocyanate, isophorone diisocyanate, tolylene diisocyanate, diphenylmethane diisocyanate, xylylene diisocyanate and tetramethylene diisocyanate; and isocyanates represented by the following formulas (1) to (5), respectively.

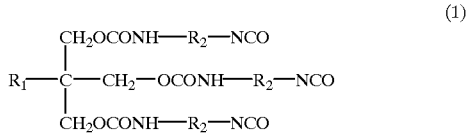

(1)

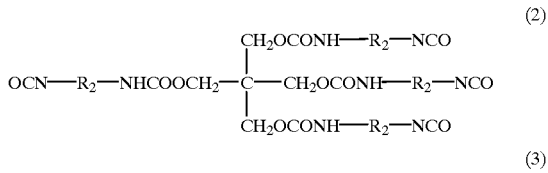

(2)

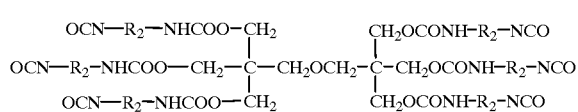

(3)

-continued

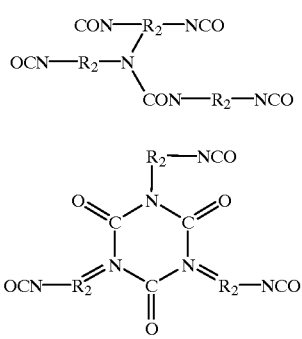

(4)

(5)

wherein $R_1$ represents an alkyl group, and $R_2$ represents an alkylene group.

The polyisocyanate is used in an amount of 0.2 to 1.2 equivalents, preferably 0.3 to 1.0 equivalent, in terms of an isocyanate group, per equivalent of the hydroxyl groups of all the polyester resins.

The base polyester resin (A), low-molecular-weight polyester resin (B) and polyisocyanate compound are reacted by mixing in a molten state. Preferred is a process to effect the reaction by adding the polyisocyanate compound to the kneaded mixture of the base polyester resin (A) and low-molecular-weight polyester resin (B), each of which has been molten in advance, and then kneading the resulting mixture in a molten state. Described specifically, this kneading in a molten state is carried out by pouring a mixture of the base polyester resin (A) and low-molecular-weight polyester resin (B) in a twin-screw extruder at a fixed speed and at the same time, pouring the polyisocyanate at a fixed speed; or by pouring the low-molecular-weight polyester resin (B), base polyester resin (A) and polyisocyanate successively in the traveling direction of the twin screw extruder and reacting them while carrying out kneading and delivery, for example, at a temperature of 100 to 200° C. At this time, the low-molecular-weight polyester resin (B) and base polyester resin (A) which are reaction starting materials to be charged or poured into the twin-screw extruder may be poured directly into the extruder from the respective reaction containers without cooling; or a resin once prepared from these starting materials is fed to a twin screw kneader after cooled and pulverized or formed into beads. In the present invention, however, a process for preparing the urethane-modified polyester resin (C) is not limited to the above-exemplified processes. It is needless to say that the reaction can be carried out by a proper process, for example, a conventionally known process of charging raw materials in a reaction container, heating them so as to convert it into the solution form and then mixing.

The urethane-modified polyester resin (C) used in the present invention preferably has a gel content of 0.1 to 25 wt. %. The gel content is determined by mixing 5 g of the resin with 100 ml of ethyl acetate for 4 hours, allowing the resulting mixture to stand overnight, quietly collecting the supernatant from the reaction mixture by a dropping pipette and then measuring the amount of the polymer dissolved in the solvent in terms of a nonvolatile content.

The term "acid value" as used herein means the number of mg of potassium hydroxide necessary for neutralizing 1 g of a resin, while the term "hydroxyl value" means the number of mg of potassium hydroxide necessary for neutralizing 1 g of the acid consumed for the reaction between the hydroxyl group of the resin with phthalic anhydride.

In the electrostatic image developing toner according to the present invention, materials ordinarily employed for the preparation of a toner, for example, a known binder resin (other than the urethane-modified polyester resin (C)), charge control agent, colorant, wax, magnetic material, abrasive and fluidizing agent can be incorporated as needed.

As the known binder resin to be used together with the above-described urethane-modified polyester resin (C), binder resin conventionally employed for electrostatic image developing toners can be used insofar as it is known to date. Examples include homopolymers of styrene or substituted styrene such as polystyrene, poly-p-chlorostyrene and polyvinyl toluene; styrene copolymers such as styrene-p-chlorostyrene copolymer, styrene-vinyl toluene copolymer, styrene-vinyl naphthalene copolymer, styrene-acrylate copolymer, styrene-methacrylate copolymer, styrene-methyl-α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer and styrene-acrylonitrile-indene copolymer; and resins such as polyvinyl chloride resin, phenol resin, naturally modified phenol resin, natural-resin-modified maleic acid resin, acrylic resin, methacrylic resin, polyvinyl acetate resin, silicone resin, polyester resins other than the above-described urethane-modified polyester resin (C), polyurethane resin, polyamide resin, furan resin, epoxy resin, xylene resin, polyvinyl butyral, terpene resin, coumarone indene resin, petroleum-base resin and cross-linked styrene base copolymer.

As the charge control agent, known charge control agents can be used either singly or in combination. It is added in an amount permitting the toner to have a desired charge amount. For example, it is preferably added in an amount of about 0.05 to 10 parts by weight based on 100 parts by weight of the binder resin. Examples of the positive charge control agent include Nigrosine dyes, quaternary ammonium salt compounds, triphenylmethane compounds, imidazole compounds and polyamine resins. Illustrative of the negative charge control agent include azo dyes containing a metal such as Cr, Co, Al and Fe, salicylic acid metal compounds, alkylsalicylic acid metal compounds and calix arene compounds.

As the colorant usable for the electrostatic image developing toner of the present invention, any colorant known to be used conventionally for the preparation of a toner can be employed. Examples include metal salts of a fatty acid, various carbon blacks and dyes or pigments such as phthalocyanine, rohdamine, quinacridone, triallylmethane, anthraquinone, azo and diazo. These colorants may be used either singly or in combination.

As the magnetic material usable for the electrostatic image developing toner of the present invention, any ferroelectric-element-containing alloy, compound or the like conventionally used for the preparation of a magnetic toner can be employed. Exemplary magnetic materials include iron oxide or compounds of a divalent metal and iron oxide such as magnetite, maghemite and ferrite; and metals such as iron, cobalt and nickel and alloys thereof with a metal such as aluminum, cobalt, copper, lead, magnesium, tin, zinc, antimony, beryllium, bismuth, cadmium, calcium, manganese, selenium, titanium, tungsten or vanadium; and mixtures thereof. These magnetic materials are preferred to have an average particle size of 0.1 to 2 μm, more preferably about 0.1 to 0.5 μm. The content of the magnetic material in the toner is usually about 20 to 200 parts by wt., preferably 40 to 150 parts by wt. based on 100 parts by wt. of the binder resin. The saturation magnetization of the toner is preferably 15 to 35 emu/g (measuring magnetic field: 1 kilo oersted).

To the toner of the present invention, known additives conventionally used for the preparation of a toner such as release agent, lubricant, fluidity improver, abrasive, conductivity imparting agent, image peeling preventive or the like can be added further internally or externally as needed. Examples of the release agent include waxes such as low-molecular-weight polyethylene, low-molecular-weight polypropylene, microcrystalline wax, carnauba wax, sazole wax and paraffin wax. The release agent is generally added to the toner in an amount of about 0.5 to 5 wt. %. Examples of the lubricant include polyvinylidene fluoride and zinc stearate. Those of the fluidity improver include colloidal silica, aluminum oxide and titanium oxide. Those of the abrasive include cerium oxide, silicon carbonate, strontium titanate, tungsten carbide and calcium carbonate. Those of the conductivity imparting agent include carbon black and tin oxide. Fine powders of a fluorine-containing polymer such as polyvinylidene fluoride are preferred from the viewpoints of fluidity, grindability and charge stability.

The toner according to the present invention can be prepared in a conventionally known manner. In general, it is preferred to prepare the toner by sufficiently mixing toner component materials as described above in a mixer such as ball mill or Henschel mixer, kneading the resulting mixture well in a heated kneader such as heated roll kneader or single-screw or twin-screw extruder, cooling and solidifying the resulting kneaded mass, roughly pulverizing the mass by a pulverizer such as hammer mill, finely pulverizing the resulting coarse particles by a jet mill or the like and then classifying the resulting particles. The preparation process of the toner is not limited to the above-described process. It is also possible to prepare the toner by another process, for example, a process of dispersing, in a binder resin solution, the other toner component materials, followed by spray drying; the so-called microcapsule method; or a polymerization-dependent process in which monomers, which will form a binder resin, are mixed with predetermined materials and then the resulting mixture is subjected to emulsion or suspension polymerization.

The toner according to the present invention can be used as a two-component developer after mixed with a carrier or as a one-component developer or microtoning developer having magnetic powders incorporated in the toner. When the toner of the present invention is employed as a two-component developer, any conventionally-known carrier can be used. Examples include magnetic powders such as iron powders, ferrite powders and nickel powders and glass beads, and these powders having a surface treated with a resin. Examples of the resin for covering the surface of the carrier include styrene-acrylate copolymers, styrene-methacrylate copolymers, acrylate copolymers, methacrylate copolymers, fluorine-containing resins, silicon-containing resins, polyamide resins, ionomer resins and polyphenylene sulfide resins; and mixtures thereof.

Among them, fluorine-containing resins and silicone-containing resins are particularly preferred for they do not form a spent toner so much.

The toner according to the present invention preferably has a weight-average particle size of 3 to 15 $\mu$m. From the viewpoint of developing properties, more preferred is a toner containing 12 to 60 toner particles % having a particle size not greater than 5 $\mu$m, 1 to 33 toner particles % having a particle size of 8 to 12.7 $\mu$m, 2.0 wt. % or less of toner particles having a particle size not less than 16 $\mu$m and has a weight-average particle size of 4 to 10 $\mu$m. The particle size distribution of the toner can be measured using, for example, a Coulter counter.

EXAMPLES

The present invention will hereinafter be described more specifically by examples, which are intended to be purely exemplary of the invention and the present invention is not limited to or by the following examples.

Preparation of a Base Polyester Resin (A)

Preparation Example A1

In a 5-liter four-necked flask equipped with a reflux condenser, water separator, nitrogen gas inlet tube, thermometer and stirrer, 40.6 mole % of "Polyol KB300" (trade name; propylene oxide adduct of bisphenol A prepared by Mitsui Chemicals Co., Ltd.), 10.2 mole % of trimethylolpropane, 4.8 mole % of stearic acid and 44.4 mole % of isophthalic acid were charged. While introducing nitrogen into the flask, dehydration condensation was carried out at 180 to 240° C.

When the acid value and hydroxyl value of the reaction product each reached a predetermined value, the reaction mixture was taken out from the flask, cooled and pulverized, whereby a base polyester resin A1 was obtained. Its physical properties are shown in Table 1.

Preparation Examples A2 to A5

In a similar manner to Preparation Example A1 except that the kinds and amounts (molar ratios) of the carboxylic acid compounds and alcohol compounds used as starting materials were changed as described in Table 1, base polyester resins A2 to A5 were prepared. Their physical properties are shown in Table 1.

TABLE 1

| | Preparation Example | | | | |
|---|---|---|---|---|---|
| | A1 | A2 | A3 | A4 | A5 |
| (Molar ratios of starting materials) mol % | | | | | |
| Polyol KB 300 | 40.6 | 15.3 | 24.1 | 24.7 | 40.6 |
| Trimethylolpropane | 10.2 | 4.3 | 4.3 | 2.1 | 10.2 |
| Diethylene glycol | 0.0 | 34.0 | 25.2 | 24.7 | 0.0 |
| Stearic acid | 4.8 | 0.0 | 0.0 | 0.0 | 4.8 |
| Isophthalic acid | 44.4 | 46.4 | 46.4 | 48.5 | 44.4 |
| (Physical properties) | | | | | |
| Acid value (KOH mg) | 13.0 | 0.3 | 0.8 | 9.5 | 17.2 |
| Hydroxyl value (KOH mg) | 55.3 | 47.7 | 45.2 | 53.4 | 58.7 |
| Tg (° C.) | 40.8 | 26.1 | 36.3 | 35.6 | 32.1 |
| Mw | 9100 | 15100 | 12900 | 7300 | 21000 |

Preparation of a Low-molecular-weight Polyester Resin (B)

Preparation Examples B1 to B5

In a similar manner to Preparation Example A1 except that the kinds and amounts (molar ratios) of the carboxylic acid compounds and alcohol compounds used as starting materials were changed as described in Table 2, low-molecular-weight polyester resins B1 to B5 were prepared. Their physical properties are shown in Table 2.

TABLE 2

|  | B1 | B2 | B3 | B4 | B5 |
|---|---|---|---|---|---|
| (Molar ratios of the starting mater-materials) | | | | | |
| Polyol KB 300 | 44.9 | 46.1 | 45.3 | 47.7 | 46.3 |
| Benzoic acid | 20.5 | 15.2 | 8.4 | 0.0 | 11.1 |
| Isophthalic acid | 0.0 | 0.0 | 46.3 | 0.0 | 42.6 |
| Terephthalic acid | 34.6 | 38.7 | 0.0 | 0.0 | 0.0 |
| DMT | 0.0 | 0.0 | 0.0 | 52.3 | 0.0 |
| (Physical properties) | | | | | |
| Acid value (KOH mg) | 4.4 | 3.6 | 26.4 | 2.7 | 7.5 |
| Hydroxyl value (KOH mg) | 4.8 | 5.0 | 3.8 | 4.2 | 3.9 |
| Tg (° C.) | 46.0 | 57.0 | 56.2 | 49.0 | 52.3 |
| MW | 4700 | 5900 | 4700 | 4900 | 4800 |

DMT: dimethyl terephthalate

Preparation of an Urethane-modified Polyester Resin (C)

Example 1

To a twin screw kneader ("KEX-40", trade name; manufactured by Kurimoto, Ltd.), 60 wt. % of the low-molecular-weight polyester resin B1 was fed at a flow rate of 6 kg/hr, followed by feeding of 40 wt. % of the base polyester resin A1 at a flow rate of 4 kg/hr. The resulting mixture was kneaded and delivered under a molten state. To the resulting resin mixture under kneading and delivery, tolylene diisocyanate was fed at a flow rate of 320 g/hr (the NCO/OH equivalent ratio corresponded to 0.82. A NCO/OH equivalent ratio =(an equivalent of NCO group of tolylene diisocyanate supplied/hr)/(an equivalent of OH group of the resin supplied/hr)=((320/176)×2/(55.3×4+4.8×6)/56.11)=0.816). Kneading was continued to effect the reaction and the resulting kneaded mass was extruded and then cooled, whereby a urethane-modified polyester resin C1 was obtained. Its physical properties are shown in Table 3.

Examples 2 to 5

In a similar manner to Example 1 except that the kind and mixing ratio of each of the base polyester resin (A) and low-molecular-weight polyester resin (B) were changed as shown in Table 3, polyurethane-modified polyester resins C2 to C5 were obtained. Their physical properties are shown in Table 3.

Comparative Examples 1 to 6

In a similar manner to Example 1 except that A1 to A5 were used as the base polyester resin, B1, B2, B3 and B5 were used as the low-molecular-weight polyester resin (B), combination and mixing ratio were in accordance with those described in the columns of C6 to C11, and tolylene diisocyanate was fed at a flow rate as described in Table 3, urethane-modified polyester resins C6 to C11 were obtained. Their physical properties are shown in Table 3.

TABLE 3

|  | Ex. 1 | Ex. 2 | Ex. 3 | Ex. 4 | Ex. 5 |
|---|---|---|---|---|---|
| Urethane-modified polyester resin (C) | C1 | C2 | C3 | C4 | C5 |
| Polyester A | A1 | A1 | A1 | A1 | A4 |
| Polyester B | B1 | B1 | B1 | B4 | B1 |
| A/B mixing ratio | 4/6 | 4.5/5.5 | 3.5/6.5 | 4/6 | 4/6 |
| Amount of A fed (kg/h) | 4 | 4.5 | 3.5 | 4 | 4 |
| Amount of B fed (kg/h) | 6 | 5.5 | 6.5 | 6 | 6 |
| Amount of TDI fed (g/h) | 320 | 330 | 310 | 300 | 300 |
| Amount of TDI (NCO/CH equivalent ratio) | 0.82 | 0.76 | 0.88 | 0.78 | 0.81 |
| Total acid value | 8 | 8 | 7 | 7 | 6 |
| Tg (° C.) | 56.2 | 56.7 | 56.5 | 56.7 | 57.2 |

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Urethane-modified polyester resin (C) | C6 | C7 | C8 | C9 | C10 | C11 |
| Polyester A | A3 | A3 | A2 | A1 | A4 | A5 |
| Polyester B | B1 | B2 | B3 | B2 | B5 | B1 |
| A/B mixing ratio | 3/7 | 3/7 | 3/7 | 4/6 | 4/6 | 5/5 |
| Amount of A fed (kg/h) | 3 | 3 | 3 | 4 | 4 | 5 |
| Amount of B fed (kg/h) | 7 | 7 | 7 | 6 | 6 | 5 |
| Amount of TDI fed (g/h) | 210 | 210 | 180 | 300 | 300 | 300 |
| Amount of TDI (NCO/OH equivalent ratio) | 0.79 | 0.78 | 0.68 | 0.76 | 0.81 | 0.62 |
| Total acid value | 3 | 3 | 19 | 7 | 8 | 11 |
| Tg (° C.) | 53.6 | 57.1 | 55.7 | 59.8 | 60.2 | 52.7 |

Evaluation of the Urethane-modified Polyester Resin

Example 6

| | |
|---|---|
| Urethane-modified polyester resin C1 | 57.5 parts by wt. |
| Magnetic material (magnetite) | 38.0 parts by wt. |
| Charge control agent (metal-containing chromium dye; "Spiron Black TRH", trade name; product of Hodogaya Chemical Co., Ltd.) | 1.5 parts by wt. |
| Wax (polyolefin wax, "Mitsui Highwax NP 105", trade name; product of Mitsui Chemicals Co., Ltd.) | 3.0 parts by wt. |

The above-described materials were mixed in a Henschel mixer and then charged and kneaded in a twin-screw heating kneader. The extrudate was cooled to room temperature, roughly pulverized in a hammer mill and then finely pulverized in a jet mill pulverizer. The finely-pulverized particles were introduced into a classifier, whereby a magnetic toner having an average particle size of 12.5 µm and containing 1.0 vol. % or less of particles having a particle size not greater than 6.4 µm and 1.0 vol. % or less of particles having a particle size not less than 20.0 µm. To 100 parts by weight of the resulting toner particles, 0.3 part by weight of hydrophobic silica ("Aerosil R-972", trade name; product of Nippon Aerosil Co., Ltd.) was added, followed by mixing, whereby a one-component magnetic developer was obtained.

The charge properties and image forming properties of the resulting one-component magnetic developer were evaluated and the results are shown in Table 4. As can be seen from Table 4, the developer obtained in this example is good in both of the charged amount and image density.

The charge properties and image forming properties were each evaluated as follows:

(Charged amount)

In a 50-cc polyethylene bottle, 1 g of the one-component magnetic developer and 19 g of non-coat ferrite carrier were charged and they were mixed for 30 minutes. The charged amount of the toner was then measured using a blow-off powder charge amount measuring device (manufactured by Toshiba Chemical Corporation).

(Test on image forming properties)

Using "NP-6650" manufactured by Cannon Corp. as a copying machine, 30,000 copies were made at normal temperature and normal humidity (23° C., 50%) (N/N), while 5,000 copies were made at high temperature and high humidity (30° C., 85%) (H/H). The image density of each of the first copy and the 30,000th copy or 5,000th copy was measured.

Examples 7 to 10

In a similar manner to Example 6 except for the use of the urethane-modified polyester resin C2 to C5 instead of the urethane-modified polyester resin C1, a one-component magnetic developer was obtained. The resulting developer was evaluated as in Example 6 and the results are shown in Table 4. As is apparent from Table 4, each of the developers obtained in Examples 7 to 10 is excellent in charged amount, image density, durability and environmental stability.

Comparative Examples 7 to 12

In a similar manner to Example 6 except for the use of urethane-modified polyester resins C6 to C11 instead of the urethane-modified polyester resin C1, one-component magnetic developers were obtained. The resulting developers were evaluated as in Example 6 and the results are shown in Table 4. As is apparent from Table 4, the developers obtained in Comparative Examples 7 to 12 are inferior to those obtained in Examples 6 to 10 both in charged amount and density of developed image.

TABLE 4

|  | Ex. 6 | Ex. 7 | Ex. 8 | Ex. 9 | Ex. 10 |
|---|---|---|---|---|---|
| Urethane-modified polyester resin (C) | C1 | C2 | C3 | C4 | C5 |
| Charged amount ($\mu C/g$) | 13.5 | 13.7 | 13.6 | 13.4 | 13.5 |
| Image density (N/N) |  |  |  |  |  |
| Initial stage | 1.28 | 1.30 | 1.31 | 1.30 | 1.30 |
| 30,000-th copy | 1.38 | 1.39 | 1.38 | 1.38 | 1.39 |
| Image density (H/H) |  |  |  |  |  |
| Initial stage | 1.25 | 1.26 | 1.24 | 1.27 | 1.26 |
| 5,000-th copy | 1.33 | 1.30 | 1.31 | 1.32 | 1.31 |

|  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|
| Urethane-modified polyester resin (C) | C6 | C7 | C8 | C9 | C10 | C11 |
| Amount of electricity charged ($\mu C/g$) | 14.0 | 14.2 | 14.0 | 13.8 | 14.1 | 14.2 |
| Image density (N/N) |  |  |  |  |  |  |
| Initial stage | 1.32 | 1.32 | 1.30 | 1.30 | 1.30 | 1.33 |
| After 30,000 copies Image density | 1.25 | 1.25 | 1.24 | 1.37 | 1.24 | 1.23 |

TABLE 4-continued

| (H/H) |  |  |  |  |  |  |
|---|---|---|---|---|---|---|
| Initial stage | 1.25 | 1.25 | 1.24 | 1.27 | 1.25 | 1.27 |
| After 5,000 copies | 1.20 | 1.20 | 1.18 | 1.32 | 1.20 | 1.20 |

TABLE 5

|  | Ex. 6 | Ex. 7 | Ex. 8 | Ex. 9 | Ex. 10 |
|---|---|---|---|---|---|
| Lowest fixing temperature (° C.) | 160< | 160< | 160< | 160< | 160< |
| Offset appearing temperature (° C.) | >240 | >240 | >240 | >240 | >240 |
| Blocking resistance | A | A | A | A | A |
| Wax dispersibility | A | A | A | A | B |
| Resistance against sticking to heated roll | A | A | A | A | B |

|  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|
| Lowest fixing temperature (° C.) | 170< | 180< | 160< | 180< | 160< | 160< |
| Offset appearing temperature (° C.) | >230 | >230 | >240 | >230 | >240 | >240 |
| Blocking resistance | A | A | A | A | A | A |
| Wax dispersibility | C | C | C | A | C | B |
| Resistance against sticking to heated roll | C | C | C | C | C | B |

With regards to the toners obtained in Examples 6 to 10 and Comparative Examples 7 to 12, lowest fixing temperature, offset appearing temperature, blocking resistance, wax dispersibility and resistance against sticking to a heated roll were studied. The results are shown in Table 5. Evaluation was carried out as follows:

(Lowest fixing temperature)

Using "NP-6650" (trade name; manufactured by Cannon Corp.) as a testing machine, each of the toners was fixed and the lowest fixing temperature which permitted fixation without causing low-temperature offset was taken as the lowest fixing temperature.

(Offset appearing temperature)

The temperature at which high-temperature offset occurred was taken as the offset appearing temperature.

(Blocking resistance)

In a wide-mouthed bottle, 50 g of each of the developers was charged and allowed to stand at 50° C. for 24 hours. Then, the temperature was caused to rise back to room temperature and existence of a large caking in the developer was visually evaluated.

A: No large caking

B: There exists a large caking but it can be loosened easily.

C: There exists a large mass which cannot be loosened easily.

(Wax dispersibility)

The toner particles was observed by a transmission electron microscope. The toner particles which were confirmed to contain particles having a wax particle size not less than 5 $\mu$m were evaluated as C, those which were confirmed to contain even a small amount of particles having a wax particle size not less than 5 $\mu$m were evaluated as B and those containing particles having smaller particle size than the above ones were evaluated as A.

(Resistance against sticking to a heated roll)

Sticking of a sheet of paper to a heated roll was observed at around the lowest fixing temperature and the toner was evaluated as C when eminent sticking was observed, as B when sticking was observed but not so eminent and as C when no sticking occurred.

What is claimed is:

1. An electrostatic image developing toner comprising an urethane-modified polyester resin (C) which has a total acid value not greater than 10 KOH mg/g and has been obtained by reacting, with a polyisocyanate compound, a molten mixture of a base polyester resin (A) having an acid value of 5 to 20 KOH mg/g and a hydroxyl value of 40 to 70 KOH mg/g and a low-molecular-weight polyester resin (B) having an acid value not greater than 5 KOH mg/g, a hydroxyl value not greater than 10 KOH mg/g and a weight-average molecular weight of 3,000 to 5,000 by using the components (A) and (B) at a weight ratio of 3 to 5:7 to 5 and the polyisocyanate compound in an amount of 0.2 to 1.2 equivalents, in terms of an isocyanate group, per equivalent of the total hydroxyl groups of the base polyester resin (A) and the low-molecular-weight polyester resin (B).

2. An electrostatic image developing toner according to claim 1, wherein the base polyester resin (A) has a glass transition point of 10 to 60° C. and has been obtained by polycondensation of at least three monomers, that is, at least one diol, at least one dicarboxylic acid and 0.5 to 20 mole %, based on the total amount of all the starting material monomers, of at least a polyol component having three or more hydroxyl groups; the low-molecular weight polyester resin (B) is a linear polyester resin having a glass transition point of 40 to 70° C. and having been obtained by polycondensation of at least two monomers, that is, at least one diol and at least one dicarboxylic acid; and the polyisocyanate compound is a diisocyanate compound.

3. An electrostatic image developing toner according to claim 2, wherein the base polyester resin (A) has been obtained by polycondensation of at least one diol, at least one dicarboxylic acid, 2 to 20 mole %, based on the total amount of all the starting material monomers, of at least one long-chain aliphatic monocarboxylic acid or long-chain aliphatic monoalcohol and 2 to 20 mole %, based on the total amount of all the starting material monomers, of a polyol component having three or more hydroxyl groups.

4. An electrostatic image developing toner according to claim 2, wherein the low-molecular weight polyester resin (B) has been obtained by polycondensation of at least one diol, at least one dicarboxylic acid and at least one monocarboxylic acid.

5. An electrostatic image developing toner according to claim 3, wherein the low-molecular weight polyester resin (B) has been obtained by polycondensation of at least one diol, at least one dicarboxylic acid and at least one monocarboxylic acid.

6. An electrostatic image developing toner according to claim 1, wherein the polyisocyanate compound is employed in an amount of 0.3 to 1.0 equivalent, in terms of an isocyanate group, per equivalent of the total hydroxyl groups of the base polyester resin (A) and the low-molecular-weight polyester resin (B).

7. An electrostatic image developing toner according to claim 2, wherein the polyisocyanate compound is employed in an amount of 0.3 to 1.0 equivalent, in terms of an isocyanate group, per equivalent of the total hydroxyl groups of the base polyester resin (A) and the low-molecular-weight polyester resin (B).

8. An electrostatic image developing toner according to claim 3, wherein the polyisocyanate compound is employed in an amount of 0.3 to 1.0 equivalent, in terms of an isocyanate group, per equivalent of the total hydroxyl groups of the base polyester resin (A) and the low-molecular-weight polyester resin (B).

9. An electrostatic image developing toner according to claim 4, wherein the polyisocyanate compound is employed in an amount of 0.3 to 1.0 equivalent, in terms of an isocyanate group, per equivalent of the total hydroxyl groups of the base polyester resin (A) and the low-molecular-weight polyester resin (B).

* * * * *